Jan. 7, 1964    J. L. SCHMIDT    3,116,514
FRANKFURTER SLICER
Filed Nov. 16, 1960

INVENTOR.
JAMES L. SCHMIDT
BY E.A. Petho

United States Patent Office

3,116,514
Patented Jan. 7, 1964

3,116,514
FRANKFURTER SLICER
James L. Schmidt, 131 Spring St., Red Bank, N.J.
Filed Nov. 16, 1960, Ser. No. 69,638
10 Claims. (Cl. 17—25)

This invention relates generally to a device for cutting meat and more particularly to such a device for cutting and tenderizing frankfurters and the like.

It has become customary to purchase frankfurters, sausages, and most other meats in a frozen form. After purchase, these meats are often stored in a freezer or in the freezing compartment of a conventional refrigerator until just prior to their use. When time permits, the frozen meat is usually allowed to defrost completely prior to being cooked, as by being exposed to normal room temperatures for a substantial period of time. However, when there is insufficient time to completely defrost the meat, as in the case of the preparation of an unexpected meal in the home, or in the case of a restaurant which does not have sufficient space to store partially thawed or defrosted food, it is not unusual to begin the cooking operation while the meat is still in a frozen or partially frozen state. When this occurs, the duration of time which may be required to thoroughly cook the meat is extended substantially over the duration of time which would otherwise be required.

In restaurants, frankfurter stands or the like where the customer is usually in a hurry to eat and be on his way, the rapidity with which he is served often determines the success and profitability of the business. The extra minutes which may be required to cook a frozen or partially frozen frankfurter may inconvenience the customer to the point that he becomes indifferent to frequenting the establishment.

It is known that a frankfurter can be cooked a great deal more quickly if the skin or outer casing is cut or punctured prior to being placed upon a grill or other cooking surface. This expedient allows the heat from the grill to penetrate into the interior of the frankfurter to substantially hasten the thorough cooking of same. Various attempts have been made to cut or puncture the skin of a frankfurter but because of its shape, it is difficult to hold on a cutting block while attempting to cut or puncture the skin.

The present invention is directed to a cutting device which facilitates in the cutting or piercing of the skin of a frankfurter. In addition to improving the cooking time, it has been found that by cutting the skin, the appearance of the final product makes it more appealing and appetizing.

In its preferred form, the present invention includes a support structure which has an inlet opening and an outlet opening for passing a frankfurter therethrough. A driving means is mounted on the support structure to engage and drive a frankfurter cutting means. The cutting means is driven rotationally and is adapted to engage the peripheral surface of a frankfurter to provide a plurality of slits therein and to move the frankfurter longitudinally through the support structure and outwardly of the outlet opening.

It is, therefore, an object of the present invention to provide a plurality of slits in the skin of a frankfurter along the length thereof in order to facilitate the cooking of same.

It is another object of the present invention to provide a frankfurter cutting device with a plurality of cyclically driven cutting members.

It is a further object of the present invention to provide a frankfurter cutting device with a plurality of cutting elements for cutting the skin of a frankfurter and for conveying the frankfurter relative to the cutting elements.

A further object of this invention is to provide a cutter for frankfurters which is of simple and economical construction.

These and other objects, features and advantages will become apparent from the following description of a preferred embodiment of the present invention taken in connection with the accompanying drawing wherein FIG. 1 is a perspective view of the frankfurter cutter of the present invention, partly in section;

Figure 1:
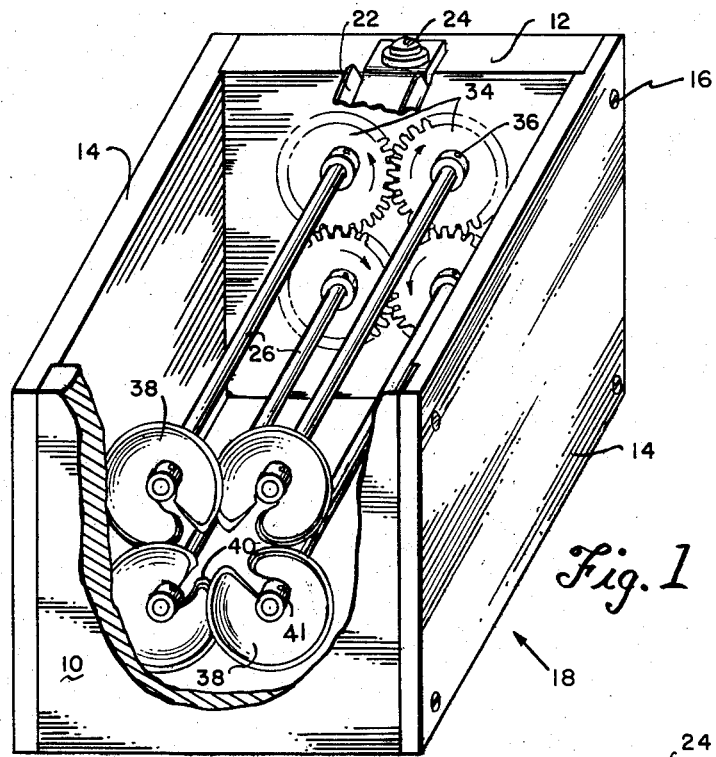

Referring now to the several figures, the meat cutter of the present invention is shown to comprise a front wall portion 10, a rear wall portion 12, and a pair of side wall portions 14, all of which are secured together by machine screws 16 or the like to form a generally rectangular casing or support structure 18.

The front wall portion 10 is provided with a generally centrally located opening 20 which is large enough to freely receive a frankfurter. The frankfurter is inserted into the opening 20 and comes out of the casing 18 via the open top portion. A guide member 22, which is of generally arcuate cross section, has one end secured at the upper edge portion of the rear wall portion 12 by a screw 24 and a free end portion disposed adjacent to the opening 20 within the casing 18 for the purpose of guiding the movement of the frankfurter upwardly and outwardly of the casing 18.

The front and rear wall portions 10, 12 are each provided with four aligned bearing openings which are equally spaced radially of the opening 20. Each bearing opening in the front wall portion 10 and its corresponding aligned opening in the rear wall portion 12 receives an opposed end of a shaft member 26. A suitable collar 28 is secured to one end of each of the shafts 26 by a set screw 30 or the like adjacent to one surface of the rear wall portion 12 in order to permanently retain the shafts within the bearing openings. A hand crank 32 or other suitable motive means is secured to the end of one of the shafts 26 externally of the enclosure 18 by the corresponding collar 28 and set screw 30.

Adjacent to the rear wall portion 12 and within the enclosure 18, a gear 34 is fixedly mounted on each of the shafts 28 by suitable fastening means such as a set screw 36. The gears 34 are each provided with the same number of teeth and are of the same diameter, with the teeth of adjacent gears engaging so that the shafts 28 will turn in unison upon rotation of the hand crank 32. By way of example, assuming that the upper left hand gear 34, as viewed in FIG. 1, is rotated in a counter clockwise direction by movement of the crank 32, the remaining gears 34 will rotate in the direction of the arrows in FIG. 1. The upper left hand shaft 26 and the lower right hand shaft 26 and corresponding gear 34 will always rotate in the same direction upon rotation of the hand crank 32. The upper right hand shaft 26 and the lower left hand shaft 26 together with their corresponding gears will also always rotate in the same direction, which is in opposition to the direction of rotation of the other two shafts.

Figure 3:
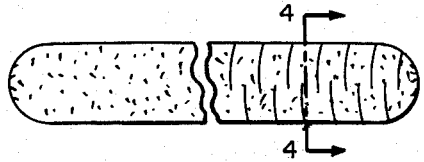
FIG. 3 is a longitudinal view of a frankfurter after passage through the frankfurter cutter of the present invention.
Figure 4:
FIG. 4 is a section taken on the line 4—4 of FIG. 3.

A cutting member 38 is fixedly mounted on each shaft 26 as by a set screw 41 adjacent to the opening 20 for the purpose of slitting the skin of a frankfurter inserted into the opening 20. The configuration of the frankfurter skin after passage through the frankfurter slicer of the present invention is illustrated in FIGS. 3 and 4. Each cutting member 38 is preferably of a discontinuous form, generally in the shape of the letter C, as shown in FIG. 1 and preferably disposed in a generally helical form about a corresponding shaft member 26. As arranged on the shaft members 26, the maximum opening between the cutting members 38 is of a smaller diameter than that of a conventional frankfurter.

A leading edge portion 40 of each cutting member 38 is preferably ground to a sharp cutting edge which will pierce the skin of a frankfurter which it may engage. This cutting edge may extend along approximately one-third of the peripheral surface of each cutting member with the remaining trailing portion of the peripheral surface being relatively blunt or dull so as not to pierce a frankfurter skin which it may engage.

Figure 2:
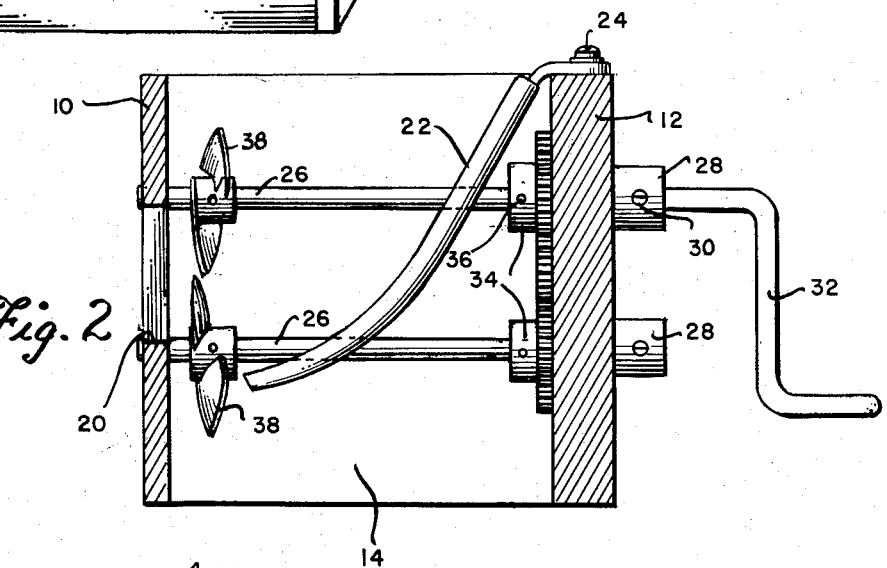
FIG. 2 is a side elevation view of the frankfurter cutter of the present invention, partly in section.

In FIG. 2, the upper and lower cutting members 38 are shown to be spaced apart slightly in their longitudinal alignment along the shafts 28 with the upper right hand knife being disposed nearer to the inner surface of the front wall portion 10. Although not shown in the figures diagrammatically opposed cutting members 38 are equally spaced from the front wall portion 10 so as to simultaneously grip or cut diametrically opposed sides of a frankfurter.

As shown in FIG. 1, the cutting members 38 are in a position to have the cutting portions 40 engage a frankfurter which may be inserted into the opening 20 upon rotation of the hand crank 32 in the clockwise direction. If the cross section of a frankfurther is considered to have four quadrants the cutting edge portions 40 will each engage and cut into the peripheral surface of the frankfurter in one of the quadrants. As the crank 32 continues to be rotated each of the cutting edge portions 40 will slit or cut approximately 90° of the peripheral surface of the frankfurter until such time as the non-sharpened portion of each cutting member 38 engages the frankfurter periphery. The upper left hand cutting member 38 and the lower right hand cutting member 38 will respectively engage and cut in the first and third quadrants of the frankfurter. Displaced therefrom slightly along the length of the frankfurter, the upper right hand cutting member 38 and the lower left hand cutting member 38 will respectively engage and cut in the second and fourth quadrants of the frankfurter.

Due to the generally helical configurations of the cutting members 38, the frankfurter is being pulled inwardly of the casing 18 while its peripheral surface is being cut. Thereafter, the non-sharpened portions of the cutting members 38 pinch or otherwise grip the frankfurter and further guide and pull it inwardly of the casing 18. After the hand crank 32 has been turned through 360°, the cutting edge portions 40 will each once again simultaneously cut a second 90 degree slit in the peripheral surface of the frankfurter, which is longitudinally spaced from the slit previously cut by the same knife.

As the crank 32 is rotated continuously, a succession of slits is cut along the frankfurter periphery while it is being drawn inwardly of the casing 18. Eventually, the inward end of the frankfurter is guided outwardly of the casing 18 via the open top portion along the guide member 22. At the completion of a cutting operation the frankfurter will disengage the cutting members 38, and with the structure of the casing 18 being suitably proportioned, be in a position to be lifted from the casing 18 by the fingers.

The spacing between slits made by the same knife is determined by the helical pitch of the cutting members 38 along the shafts 26, and as is apparent, the pitch of the knives may be varied to have closely or distantly spaced slits along the frankfurter periphery.

By sharpening each cutting member 38 throughout its peripheral length the final external configuration of a frankfurter may be substantially varied from that shown in FIGS. 3 and 4. Although not shown, it is contemplated that a frankfurter cutter according to the present invention may utilize less or more than the four cutting members 38 which are shown to produce a differently appearing final product.

While only one embodiment of the present invention has been shown and described herein, it is to be understood that it is for purposes of illustration only and that various changes may be made therein without departing from the spirit of the invention as defined in the appended claims.

I claim:

1. In a device for cutting frankfurters, the combination comprising a support structure having an inlet opening and an outlet opening for the passage of a frankfurter therethrough, driving means, and cutting means driven by said driving means and engaging a frankfurter inserted in said inlet opening to simultaneously provide plural slits in the skin of said frankfurther and to move said frankfurter longitudinally through said support structure and outwardly of said outlet opening.

2. In a device for cutting frankfurters, the combination comprising a support structure having an inlet opening and an outlet opening for passage of a frankfurter therethrough, driving means, and a plurality of arcuate cutting members rotated by said driving means for simultaneously cutting slits in a frankfurter and for moving same longitudinally through said support structure and outwardly of said outlet opening.

3. In a device for cutting frankfurters, the combination comprising a support structure having an inlet opening and an outlet opening for the passage of a frankfurter therethrough, a plurality of shaft members disposed in parallel spaced relationship about said inlet opening, cutting means secured to each of said shaft members and disposed adjacent to one end thereof, and means engaging said shafts and driving same in unison, whereby a frankfurter inserted in said inlet opening is engaged by said cutting means and simultaneously cut and moved outwardly of said outlet opening thereby.

4. In a device for cutting frankfurters, the combination comprising a support structure having an inlet opening and an outlet opening for the passage of a frankfurter therethrough, a plurality of shaft members disposed in a parallel equally-spaced relationship about said inlet opening, a cutting member secured to each of said shaft members adjacent to one end, and means engaging said shafts and driving same in unison, whereby a frankfurter inserted into said inlet opening is engaged by said cutting members and simultaneously cut in its peripheral surface while being moved longituidnally thereby outwardly of said outlet opening, said cutting members each being generally of a discontinuous arcuate form generally in the form of a helix and disposed along a portion of the length of a corresponding shaft member.

5. The combination of a device for cutting frankfurters according to claim 4, wherein the peripheral edge of each said cutting member is ground to a sharp cutting edge for only a portion of its length.

6. The combination of a device for cutting frankfurters according to claim 5, wherein the sharp cutting edge of said cutting member is that portion of its peripheral edge which is disposed nearest to said inlet opening.

7. In a device for cutting frankfurters, the combination comprising a support structure having an inlet opening and an outlet opening for the passage of a frankfurter therethrough, four shaft members disposed in a parallel equally-spaced relationship about said inlet opening, a cutting member secured adjacent to one end of each said shaft members, and means engaging said shafts and driving same in unison, whereby a frankfurter inserted into said inlet opening is engaged by said cutting members and simultaneously cut in its peripheral surface while being moved longitudinally thereby outward of said outlet opening, said cutting members each being generally of a discontinuous arcuate form generally in the form of a helix and disposed along a portion of the length of a corresponding shaft member.

8. The combination of a device for cutting frankfurters according to claim 7, wherein the peripheral edge of each said cutting member is ground to a sharp cutting edge for only a portion of its length.

9. The combination of a device for cutting frankfurters according to claim 8, wherein the sharp cutting edge of said cutting member is that portion of its peripheral edge which is disposed nearest to said inlet opening.

10. The combination of a device for cutting frankfurters according to claim 9, wherein the cutting members are disposed on their respective shaft members in such a manner that the sharp cutting edge of only one pair of diametrically opposed cutting members engage the peripheral surface of a frankfurter at any instant.

References Cited in the file of this patent

UNITED STATES PATENTS

| | | |
|---|---|---|
| 247,511 | Nesbitt | Sept. 27, 1881 |
| 2,577,530 | Kerr | Dec. 4, 1951 |
| 2,675,580 | Pesce | Apr. 20, 1954 |
| 2,981,971 | Zubrychi | May 2, 1961 |